(12) United States Patent
Sandberg et al.

(10) Patent No.: US 9,954,641 B2
(45) Date of Patent: Apr. 24, 2018

(54) METHODS AND DEVICES FOR DETERMINING LINK ADAPTATION PARAMETERS

(71) Applicant: Telefonaktiebolaget L M Ericsson (publ), Stockholm (SE)

(72) Inventors: David Sandberg, Solna (SE); Mats Åhlander, Täby (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 96 days.

(21) Appl. No.: 14/911,325

(22) PCT Filed: Aug. 12, 2013

(86) PCT No.: PCT/SE2013/050963
§ 371 (c)(1),
(2) Date: Feb. 10, 2016

(87) PCT Pub. No.: WO2015/023218
PCT Pub. Date: Feb. 19, 2015

(65) Prior Publication Data
US 2016/0204844 A1 Jul. 14, 2016

(51) Int. Cl.
*H04B 7/06* (2006.01)
*H04L 25/02* (2006.01)
*H04L 1/00* (2006.01)

(52) U.S. Cl.
CPC .......... *H04L 1/0026* (2013.01); *H04B 7/063* (2013.01); *H04B 7/0626* (2013.01);
(Continued)

(58) Field of Classification Search
CPC . H04L 1/0026; H04L 25/021; H04L 25/0252; H04L 25/0202;
(Continued)

(56) References Cited

U.S. PATENT DOCUMENTS

| | | | | |
|---|---|---|---|---|
| 2006/0233222 A1* | 10/2006 | Reial | .................... | H04B 17/309 375/147 |
| 2009/0219912 A1* | 9/2009 | Wengerter | .............. | H04L 47/14 370/345 |

(Continued)

FOREIGN PATENT DOCUMENTS

EP          1376961 A1     1/2004

OTHER PUBLICATIONS

Bottomley et. al., "Advanced receivers for WCDMA terminal platforms and base stations," Ericsson Review No. 2, 2006, pp. 54 56 58 https://www.ericsson.com/ericsson/corpinfo/publications/review/2006_02/02.shtml.*

(Continued)

*Primary Examiner* — Maharishi V Khirodhar
*Assistant Examiner* — Kenneth P Hunt
(74) *Attorney, Agent, or Firm* — Murphy, Bilak & Homiller, PLLC (57) ABSTRACT

The teachings relate to a method 100 performed in a network node 2 for determining a link adaptation parameter, $SINR_{LA,i}$, for a wireless device 3. The network node 2 supporting a multi-antenna transmission mode comprising spatial multiplexing layers for transmission of data on a channel between the wireless device 3 and the network node 2. The method 100 comprises: determining 110 a channel covariance matrix $H^H H$ for the channel, wherein H is the channel matrix for the channel; approximating 120 a post-equalizer signal to interference plus noise ratio $SINR_{approx.}$, for a spatial multiplexing layer i using the channel covariance matrix $H^H H$; determining 130 an offset $SINR_{offset}$, i to be the difference between a received signal to interference plus noise ratio $SINR_{received}$ and the approximated post-equalizer signal to interference plus noise ration $SINR_{approx.,i}$, and determining 140 the link adaptation parameter $SINR_{LA,i}$ to be the (Continued)

approximated post-equalizer signal to interference plus noise ratio $SINR_{approx,i}$ compensated by the determined offset $SINR_{offset}$. Corresponding network node, computer program and computer program products are also provided.

24 Claims, 5 Drawing Sheets

(52) U.S. Cl.
CPC ........ *H04L 25/021* (2013.01); *H04L 25/0204* (2013.01); *H04L 25/0242* (2013.01); *H04L 25/0256* (2013.01)

(58) Field of Classification Search
CPC .......... H04L 25/0204–25/0208; H04L 25/022; H04L 25/0224–25/0238; H04L 25/024; H04L 25/0242–25/0248; H04L 25/025; H04L 25/0256; H04B 7/0626; H04B 7/063
USPC .......................................................... 370/252
See application file for complete search history.

(56) References Cited

U.S. PATENT DOCUMENTS

| | | | |
|---|---|---|---|
| 2012/0082259 | A1 | 4/2012 | Yue et al. |
| 2012/0287813 | A1* | 11/2012 | Alm ...................... H04L 1/0003 370/252 |
| 2013/0016767 | A1* | 1/2013 | Pean ...................... H04L 1/0001 375/232 |
| 2014/0233466 | A1* | 8/2014 | Pourahmadi ........ H04L 27/2613 370/329 |
| 2015/0003337 | A1* | 1/2015 | Reial ..................... H04L 1/0003 370/329 |
| 2016/0380658 | A1* | 12/2016 | Su ........................ H04B 1/1027 375/348 |

OTHER PUBLICATIONS

Unknown, Author, "3GPP TS 36.211 V10.4.0 (Dec. 2011)", 3rd Generation Partnership Project; Technical Specification Group Radio Access Network; Evolved Universal Terrestrial Radio Access (E-UTRA); Physical Channels and Modulation (Release 10), Dec. 2011, pp. 1-101.

Unknown, Author, "3GPP TS 36.213 V10.5.0 (Mar. 2012)", 3rd Generation Partnership Project; Technical Specification Group Radio Access Network; Evolved Universal Terrestrial Radio Access (E-UTRA); Physical layer procedures (Release 10), Mar. 2012, pp. 1-125.

Viering, I. et al., "Improving Uplink Adaptive Antenna Algorithms for WCDMA by Covariance Matrix Compensation", 2002 IEEE 56th Vehicular Technology Conference, vol. 4, 2002, pp. 2149-2153.

* cited by examiner

METHODS AND DEVICES FOR DETERMINING LINK ADAPTATION PARAMETERS

TECHNICAL FIELD

The technology disclosed herein relates generally to the field of wireless communication systems, and in particular to link adaptation in such wireless communication systems.

BACKGROUND

In wireless communication systems performance can generally be improved if the characteristics of a transmission are adapted to the characteristics of the radio channel. Even though there are techniques which perform such adapting without much prior information about the channel, e.g. Incremental Redundancy (IR) used together with some Automatic Repeat Request (ARQ) scheme, the performance can still be improved, if each transmission as such, is better adapted to the channel characteristics.

The term Link Adaptation (LA) is often used when referring to the selection of Modulation and Coding Scheme (MCS) to be used for a certain transmission in an attempt to adapt the characteristics of the transmission to the characteristics of the channel. However, there are many other characteristics of the channel which could be exploited to further improve the performance. One of those is the channels suitability for higher rank transmissions using Spatial Multiplexing (SM), whereby the performance may be improved e.g. in terms of higher data rate and signal strength. It is sometimes possible to utilize this type of transmission in case of Multiple Input Multiple Output (MIMO) setups, where several antennas are present for transmission and reception respectively.

In case of LTE systems, there are different uplink transmission modes defined (refer to 3GPP TS-36.213). Depending on the uplink transmission mode being used, Closed Loop Spatial Multiplexing (CLSM) might be supported as transmission scheme for the Physical Uplink Shared Channel (PUSCH). The term Closed Loop (CL) indicates the need of Channel State Information (CSI) for the transmission scheme to operate efficiently.

In LTE there are basically two ways to get uplink CSI in an eNodeB (evolved Node B, also denoted eNB). First there is the Sounding Reference Symbols (SRS) that are allocated to a wireless device semi-statically and used specifically for channel quality estimation purposes. The other is the Demodulation Reference Symbols (DMRS) that are multiplexed with normal PUSCH transmissions. These are mainly aimed for channel estimation in order to demodulate PUSCH data, but they can also be used for channel quality estimation.

The CSI that has been gained from SRS or DMRS is used to adapt different properties of uplink transmissions. Such properties are transmission rank (the number of spatial layers that are used for the transmission), the Modulation and Coding Scheme (MCS) that are used for each layer, the Precoding Matrix that is used for precoding of the transmission as well as the transmission bandwidth. As an intermediate step to select these parameters, a post-equalizer signal to interference plus noise ratio (SINR) for a layer is calculated. This post-equalizer SINR is calculated given the precoder, rank and allocation size and is used to calculate the MCS for the layer.

In order to be able to calculate the post-equalizer SINR that can be used for link adaptation, a scheduler/link adaptation needs to have access to the complex channel coefficients of the MIMO channel. Since the channel coefficients vary over frequency due to multipath fading several channel matrices needs to be stored to cover the whole system bandwidth. The required number of channel matrices depends on the frequency correlation of the channel. Also, since the multipath fading is unique to each user the channel coefficients also need to be stored per user. All in all, all the required channel coefficients will consume a lot of memory in the eNodeB and does not scale well with the number of users and number of receive antennas.

Further, selecting precoder, rank, allocation size, and MCS typically involves performing an exhaustive search through the possible parameter combinations to see which combination maximizes the throughput for the particular user. This involves a large amount of calculations.

The MIMO link adaptation thus involves complex calculations that are time-consuming and require high processing capacity and also large data storage.

SUMMARY

An object of the present invention is to solve or at least mitigate one or more of the above mentioned problems.

The object is according to a first aspect achieved by a method performed in a network node for determining a link adaptation parameter for a wireless device. The network node supports a multi-antenna transmission mode comprising spatial multiplexing layers for transmission of data on a channel between the wireless device and the network node. The method comprises determining a channel covariance matrix $H^H H$ for the channel, wherein H is the channel matrix for the channel; approximating a post-equalizer signal to interference plus noise ratio $SINR_{approx., i}$ for a spatial multiplexing layer i using the channel covariance matrix $H^H H$; determining an offset $SINR_{offset, i}$ to be the difference between a received signal to interference plus noise ratio $SINR_{received}$ and the approximated post-equalizer signal to interference plus noise ratio $SINR_{approx., i}$; and determining the link adaptation parameter $SINR_{LA,i}$ to be the approximated post-equalizer signal to interference plus noise ratio, $SINR_{approx., i}$ compensated by the determined offset $SINR_{offset}$.

When link adaptation is performed a link adaptation parameter, in particular signal to interference plus noise, is calculated using a simplified expression that requires compact channel quality information. At reception the difference between the result of the simplified link adaptation parameter calculation and the actual received link adaptation parameter is calculated, giving an offset. This link adaptation parameter difference, the offset, may then be used to calculate the link adaptation parameter when link adaptation is performed in the future. A much reduced computational load is thereby provided and also corresponding reductions in processing time, processing capacity and memory requirements.

The object is according to a second aspect achieved by a network node for determining a link adaptation parameter $SINR_{LA,i}$ for a wireless device. The network node is configured to support a multi-antenna transmission mode comprising spatial multiplexing layers for transmission of data on a channel between the wireless device and the network node. The network node comprises a processor and memory, the memory containing instructions executable by the processor, whereby the network node is operative to: determine a channel covariance matrix, $H^H H$, for the channel, wherein H is the channel matrix for the channel; approximate a post-equalizer signal to interference plus noise ratio, SINR$_{approx,i}$, for a spatial multiplexing layer i using the channel covariance matrix, H$^H$H ; determine an offset, SINR$_{offset, i}$, to be the difference between a received signal to interference plus noise ratio, SINR$_{received}$, and the approximated post-equalizer signal to interference plus noise ratio, SINR$_{approx,i}$; and determine the link adaptation parameter SINR$_{LA,i}$ to be the approximated post-equalizer signal to interference plus noise ratio, SINR$_{approx,i}$, compensated by the determined offset SINR$_{offset}$.

The object is according to a third aspect achieved by a computer program for network node for determining a link adaptation parameter, SINR$_{LA,i}$, for a wireless device. The network node is configured to support a multi-antenna transmission mode comprising spatial multiplexing layers for transmission of data on a channel between the wireless device and the network node. The computer program comprises computer program code, which, when run on the network node causes the network node to: determine a channel covariance matrix, H$^H$H, for the channel, wherein H is the channel matrix for the channel; approximate a post-equalizer signal to interference plus noise ratio, SINR$_{approx,i}$, for a spatial multiplexing layer i using the channel covariance matrix, H$^H$H; determine an offset, SINR$_{offset, i}$, to be the difference between a received signal to interference plus noise ratio, SINR$_{received}$, and the approximated post-equalizer signal to interference plus noise ratio, SINR$_{approx,i}$; and determine the link adaptation parameter SINR$_{LA,i}$ to be the approximated post-equalizer signal to interference plus noise ratio, SINR$_{approx,i}$, compensated by the determined offset SINR$_{offset}$.

The object is according to a fourth aspect achieved by a computer program product comprising a computer program as above, and a computer readable means on which the computer program is stored.

Further features and advantages of the present teachings will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Figure 1:
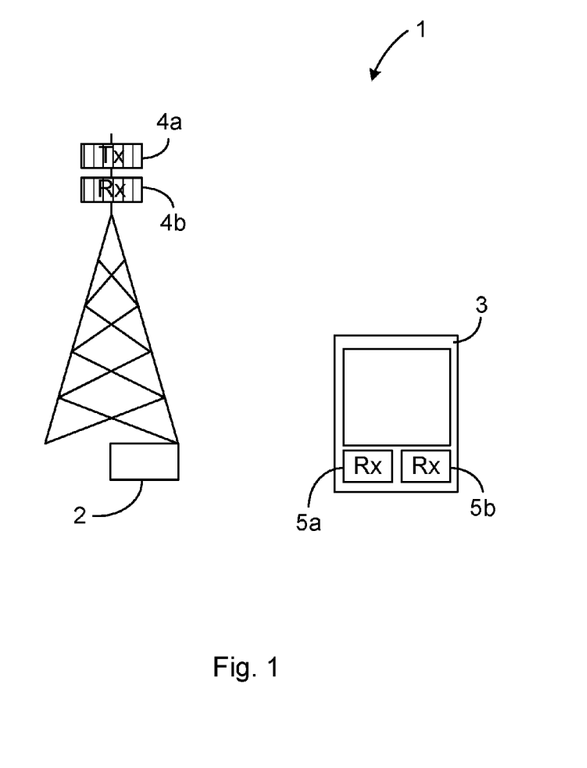
FIG. 1 illustrates schematically an environment in which embodiments of the present teachings may be implemented.

FIG. 1 illustrates schematically an environment in which embodiments of the present teachings may be implemented.

In particular, a wireless communication system 1 comprises a number of network nodes 2, e.g. eNodeBs, and a number of wireless devices 3. The network node 2 is configured to provide wireless communication channels to the wireless device 3. The wireless device 3 comprises a number of transmit antennas 5a, e.g. two, four or eight transmit antennas and a number of receive antennas 5b, e.g. two, four or eight receive antennas. The wireless device 3 may comprise any type of device configured for wireless communication. Such wireless device 3 may be denoted and exemplified in various ways e.g. a user equipment, a mobile communication device, subscriber terminal, and may comprise e.g. a cellular telephone, a computing device, a smart phone etc.

The network node 2 is configured to support MIMO and comprises a number of transmit antennas 4a and a number of receive antennas 4b. It is noted that, although denoted transmit antennas and receive antennas, the same physical antennas may be used for receiving and transmitting. The network node 2 comprises receiving circuitry and transmitting circuitry connected to such physical antennas for receiving and transmitting signaling, respectively. The physical antennas may use the same or separate hardware to process radio signals, and the network node 2 may thus comprise one or more radio frequency chains, comprising duplex filters etc. For sake of clarity, intermediate devices, circuitry etc. such as duplex filters, have been omitted. "Transmit antenna" may thus encompass a physical antenna and transmitting circuitry, and "receive antenna" may encompass a physical antenna and receiving circuitry, wherein the physical antenna may (but need not) be a single same antenna. Correspondingly, the wireless device 3 is configured to use MIMO and comprises a number of transmit antennas 5a and a number of receive antennas 5b. A fundamental MIMO scheme is that of precoded spatial multiplexing (SM) where multiple individually encoded streams are transmitted in parallel from the wireless device 3 to the network node 2. In precoding each of the multiple streams are sent from transmit antennas 5a of the wireless device 3 with independent and appropriate weighting per each antenna such that data throughput between the wireless device 3 and the network node 2 is maximized. Usually only a limited number of predefined precoding weights are used, called a codebook. The codebook is know by the network node 2 as well as by the wireless device 3, so when the network node 2 informs the wireless device 3 about which set of precoding weights (also denoted precoder) to use, it only needs to send a number corresponding to an index that the precoding weights have in the codebook. This number is usually denoted precoding matrix index (PMI).

Measurements at a receiver of the network node 2 and feedback signals by the wireless device 3, e.g. the previously mentioned SRS and DMRS, enables the network node 2 to determine the number of streams that can be supported across single or multiple users. A simple MIMO antenna configuration comprises using two antennas at the transmitter and two antennas at the receiver resulting in a 2×2 MIMO channel (with channel matrix H). The notation N$_{Tx}$ used herein means N transmit antennas and the notation N$_{Rx}$ correspondingly means N receive antennas.

Briefly, in accordance with the present teachings, when link adaptation is performed the post-equalizer SINR is calculated using a simplified expression that requires compact channel quality information. At reception the difference between the result of the simplified post-equalizer SINR calculation and the actual received post-equalizer SINR is calculated. This SINR difference is then used to calculate SINR when link adaptation is performed in the future, i.e. for future transmissions.

First, the present teachings is described in relation to prior art, indicating distinctions from the prior art, and thereby providing a thorough understanding of the present teachings. In the following, LTE uplink is used as an example, the network node thus being exemplified by an eNodeB.

Example of a prior art solution:
1. A channel between a wireless device and an eNodeB is estimated using SRS.
2. The channel coefficients are stored in the eNodeB. This requires $N_{TX}$ times $N_{RX}$ complex values per physical resource block (PRB) and user, where, as mentioned earlier, $N_{TX}$ and $N_{RX}$ are the number of transmit and receive antennas respectively.
3. Link adaptation uses the stored channel estimates to calculate SINR using an expression that is matched to the type of receiver used in the physical layer receiver. For each possible parameter combination (e.g. precoder, transmission rank, allocation size, MCS) the SINR needs to be calculated to determine which combination would give a maximized throughput. As mentioned earlier, the SINR can be very costly to calculate if it is to be perfectly matched to the type of receiver that is used in the physical layer. Examples of different types of receiver comprise minimum means squared error (MMSE) receivers, successive interference cancellation (SIC) receivers and parallel interference cancellation (PIC) receivers.

Corresponding example using the present teachings:
1. A channel H between the wireless device 3 and the network node 2, e.g. an eNodeB, is estimated using SRS (or DMRS)
2. The channel covariance matrices $H^H H$ are stored in the network node 2. This requires $\min(N_{TX}, N_{RX})^2$ complex values per PRB and user.
3. Link adaptation uses the stored channel covariance matrix estimates $H^H H$ to calculate SINR using a simplified expression (giving simplified SINR) that does not need to be matched to the type of receiver that is used in the physical layer receiver.
4. To the calculated SINR an offset may be used for compensation, e.g. added to the calculated SINR. This offset is calculated based on the difference between the simplified SINR and the received SINR for previous transmissions. Such received SINR for previous transmission is also denoted true SINR in the present description.
5. Upon reception of a transmission the difference between the simplified and the received (true) SINR (i.e. the offset) is updated.

Figure 2:
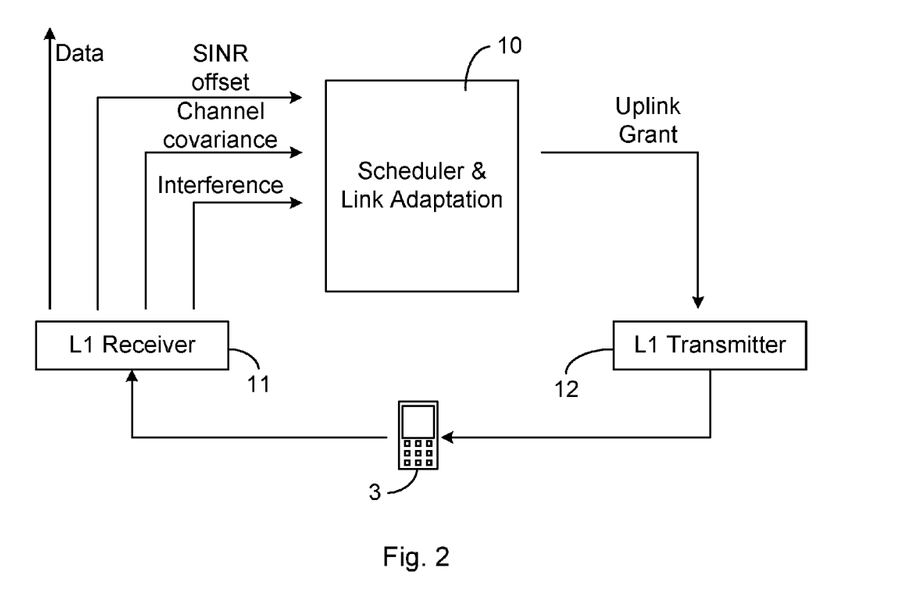
FIG. 2 illustrates schematically a scheduling and link adaptation procedure.

Reference is now made to FIG. 2, schematically illustrating a scheduling and link adaptation procedure. Scheduling and link adaptation is performed in a scheduler device indicated at reference numeral 10, which scheduler device 10 may be part of the network node 2 or be a separate part operatively connected to the network node 2. The scheduling and link adaptation is based on measurements from the physical layer, e.g. by means of a physical layer 1 (L1) receiver indicated at reference numeral 11. The earlier mentioned SRS and DMRS are examples of signals that may be used in the link adaptation. The measurements can for example be the received signal power for earlier uplink transmissions and measured noise and interference, and are used to predict the received SINR the next time the wireless device 3 is transmitting. In accordance with the present teachings, the L1 receiver 11 provides various parameters to the scheduler device 10, e.g. related to interference, channel covariance and a SINR offset (to be described later).

The output of the scheduler device 10 is a set of transmission parameters to be used by the wireless device 3. The transmission parameters are sent to the wireless device 3 in an uplink grant message, using a L1 transmitter 12. For the single antenna transmission mode there are mainly two parameters that are controlled by link adaptation, namely the number of PRBs (NPRB) and the Modulation and Coding Scheme (MCS).

When uplink Single-User MIMO (SU-MIMO) is used there are two more transmission parameters that need to be selected, namely the number of layers ($N_{layer}$, also called transmission rank) and one of the precoders from the precoder codebook (specified by 3GPP TS 36.211 [1]). For a wireless device 3 with 2 transmit antennas 5a the codebook consists of 7 precoding matrices (also denoted precoders), where one precoding matrix is used for rank two transmission and the remaining six is used for rank one transmission.

A typical criterion for the selection of these parameters ($N_{layer}$ and precoder) is to choose the parameter combination that maximizes the estimated throughput. This can be done by calculating the SINR (for each layer in case of multi-layer transmission) for each combination of the transmitter parameters and select the combination that maximizes the throughput. But, as mentioned earlier, calculating the true post-equalizer SINR is however not trivial. In the following it will be assumed that the equalizer comprises a MMSE receiver, for which the true post equalizer SINR for stream i is calculated as:

$$SINR_{true,i} = \frac{\lambda_i}{1 - \lambda_i}, \quad (1)$$

where $\lambda_i$ are the i:th element in $\lambda$ is given by:

$$\lambda = PW^H H^H (HWW^H H^H P + R)^{-1} HW \quad (2),$$

where P is the transmit power used by the wireless device 3, H is the channel matrix, R is the interference covariance matrix and $X^H$ denotes the Hermitian transpose of X. It should be noted that both H and R are in fact frequency selective, meaning that they change over frequency (PRBs) and need to be represented by different matrices for different sub-bands.

It can be seen that this calculation requires full knowledge of the channel matrices (requiring significant storage capacity) as well as a number of matrix multiplications and a matrix inversion. It would be advantageous if the amount of storage as well as the computational complexity could be reduced.

Using channel covariance matrix, $H^H H$, instead of H and approximating the SINR for layer i in the equation (known as Shannon's equation for channel capacity) gives:

$$SINR_{approx,i} = \frac{S_{i,i}}{R_{i,i}} \cdot \gamma \quad (3)$$

$$S = PW^H H^H HW,$$

where S is an approximation of the wanted post-equalizer signal power, and R is the noise and interference covariance matrix, W is the precoding vector for the transmission, and P is the transmit power of the transmission. The computational complexity is significantly reduced for this calculation compared to calculating the true post-equalizer SINR according to above.

In the above equation (3) the factor γ is used to account for inter-stream interference between the stream transmitted from a first antenna and the stream transmitted from a second antenna. The factor γ can be calculated according to $$\gamma = \begin{matrix} 1 & \text{rank} = 1 \\ |G|/(g_{11} \cdot g_{22}) & \text{rank} > 1, \end{matrix} \qquad (4)$$

wherein G comprises $$G = \begin{bmatrix} g_{11} & g_{12} \\ g_{21} & g_{22} \end{bmatrix}$$

and is equal to $H^H H$.

When equalization is performed in the L1 receiver 11 the receiver matrix (which is equation (3) except for the last multiplication with HW, i.e. $S=PW^H H^H$) has to be calculated. In accordance with the present teachings, the post-equalizer SINR (i.e. $S=PW^H H^H HW$) is also calculated. To also calculate this post-equalizer SINR adds relatively little additional complexity since the receiver matrix is already available.

By using the above approximation some approximation error is introduced. In particular it was noted that as the number of layer $N_{layer}$ increased, the equation (3) gave less accurate result. However, by applying feedback compensation this error can be mitigated.

When an uplink transmission is received in the L1 receiver 11 the true post-equalizer SINR ($SINR_{received}$) is calculated in accordance with the above. In addition, the simplified SINR ($SINR_{approx}$) according to (3) is also calculated. Assuming that the SINR values are given in dB, an SINR offset can then be calculated as $$SINR_{offset,i} = SINR_{received,i} - SINR_{approx,i} \qquad (5)$$

It may also be favorable to apply some kind of filtering to the calculated SINR offset. This could for example be done with a simple 1-tap IIR filter according to $$SINR_{offsetFilt,i} = (1-\alpha) \cdot SINR_{offsetFilt,i} + \alpha \cdot SINR_{offset,i} \qquad (6)$$

wherein α is a filter coefficient (also denoted tap weight). The result, i.e. the $SINR_{offsetFilt}$, is then stored in the network node 2 and used the next time the wireless device 3 is being scheduled.

When the wireless device 3 is scheduled the SINR used for link adaptation (rank selection, MCS selection etc.) may then calculated in accordance with $$SINR_{LA,i} = SINR_{approx,i} + SINR_{offsetFilt,i} \qquad (7)$$

The use of channel covariance matrix, $H^H H$ scales better to the number of reception antennas 4b than the prior art use of the channel matrix H, since $H^H H$ is smaller than H when the number of receive antennas is large. A particular example illustrating this: consider the case of 8 reception antennas and two transmit antennas, giving a channel matrix H of size [8×2]. $H^H$ is then of size [2×8], and $H^H H$ is of size [2×2], that is, irrespective of number of reception antennas the size of $H^H H$ does not increase.

Figure 3:
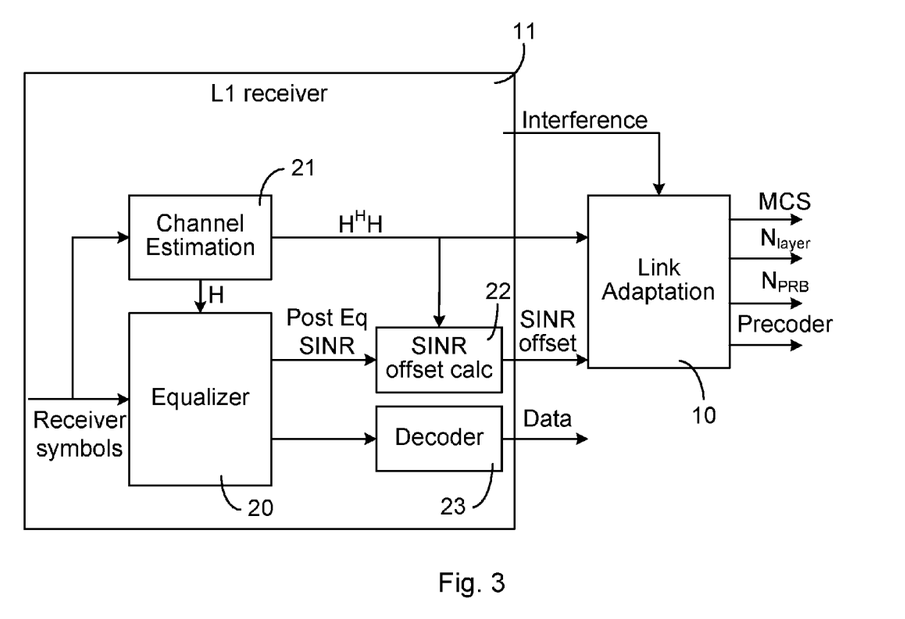
FIG. 3 is a schematic diagram of SINR offset calculation.

With reference now to FIG. 3, the above is recapitulated in the following. An equalizer 20 of the receiver 11 receives a signal comprising symbols. The signal is also input to a channel estimation device 21, which estimates a channel matrix H for the MIMO channel. The channel estimation device 21 outputs the estimated channel matrix H to the equalizer 20. The channel estimation device 21 also outputs, in accordance with the present teachings, the calculated channel covariance matrix $H^H H$ to a SINR offset calculator 22 and to the scheduler device 10. The equalizer 20 determines, based on the received symbols and the estimated channel matrix H, the post-equalizer SINR and outputs it to the SINR offset calculator 22 (and also to a decoder 23 decoding a data part of the signal). SINR offset calculator 22, having received the channel covariance matrix $H^H H$, calculates an SINR offset as described above, and outputs the result to the scheduler device 10. The scheduler device 10 is now able to perform link adaptation based on the received channel covariance matrix $H^H H$ and SINR offset, and interference information (compare also with FIG. 2). The scheduler device 10 is thus able to provide configuration parameters such as MCS, $N_{layer}$, $N_{PRB}$ and precoder to the wireless device 3.

In a use case, applying the present teachings, the wireless device 3 sends data, e.g. on PUSCH, the data comprising inter alia the number of physical resource blocks (PRB), $N_{PBR}$, PMI, $PBR_{start}$ (i.e. where in the frequency band the first PBR is found), suggested MCS and number of layers to use, $N_{layer}$. The network node 2 receives this data and determines received SINR, $SINR_{received}$ and approximated SINR, $SINR_{approx}$ based on the parameters used by the wireless device 3. Then an offset, $SINR_{offset}$, is determined by the subtraction: $SINR_{received} - SINR_{approx}$. Filtering may be performed, providing a filtered $SINR_{offset}$. The network node 2 then schedules new downlink data to the wireless device 3, going through all hypothesis (i.e. combinations) of the received data $N_{PBR}$, PMI, $PBR_{start}$, MCS and $M_{layer}$, using the described simplified calculations, giving a $SINR_{approx}$ for each hypothesis. That is, instead of using the true (received) $SINR_{received}$ for each hypothesis, which is very costly in terms of memory and processing, the approximated SINR is used. The SINR used in the scheduling is then the $SINR_{approx}$ giving e.g. the highest throughput compensated with the offset, $SINR_{offset}$, i.e. SINR(used in scheduling)= chosen $SINR_{approx} + SINR_{offset}$. In accordance with the present teachings, the true SINR, i.e. the $SINR_{received}$, is calculated only once for each data packet, which results in a much reduced number of calculations and also less complex calculations.

Figure 4:
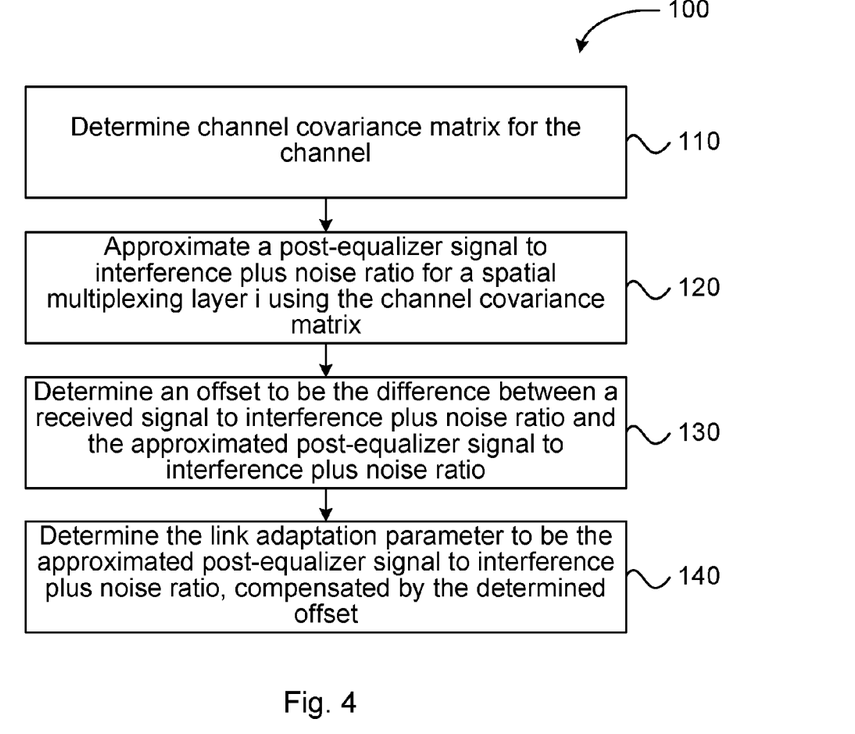
FIG. 4 illustrates a flow chart over steps of a method in a network node in accordance with the present teachings.

FIG. 4 illustrates a flow chart over steps of a method in a network node in accordance with the present teachings. The method 100 may be performed in a network node 2, e.g. an eNB, for determining a link adaptation parameter $SINR_{LA,i}$ for a wireless device 3. The network node 2 supports a multi-antenna transmission mode comprising spatial multiplexing layers for transmission of data on a channel between the network node 2 and the wireless device 3. The method 100 comprises determining 110 a channel covariance matrix $H^H H$ for the channel, wherein H is the channel matrix for the channel.

The method 100 comprises approximating 120 a post-equalizer signal to interference plus noise ratio $SINR_{approx,i}$ for a spatial multiplexing layer i using the channel covariance matrix $H^H H$.

The method 100 comprises determining 130 an offset $SINR_{offset,i}$ to be the difference between a received signal to interference plus noise ratio $SINR_{received}$ and the approximated post-equalizer signal to interference plus noise ratio $SINR_{approx,i}$.

The method 100 comprises determining 140 the link adaptation parameter $SINR_{LA,i}$ to be the approximated post-equalizer signal to interference plus noise ratio, $SINR_{approx.,i}$, compensated by the determined offset $SINR_{offset}$.

In a dB-domain, the determining 140 is performed by adding the approximated post-equalizer signal to interference plus noise ratio, $SINR_{approx.,i}$ and the determined offset $SINR_{offset}$. In a linear domain the determining 140 is performed by a multiplication, in particular by multiplying the approximated post-equalizer signal to interference plus noise ratio, $SINR_{approx.,i}$ with the determined offset $SINR_{offset}$.

In an embodiment, the offset $SINR_{offset,i}$ is stored in the network node 2 and updated upon reception, from the wireless device 3, of a transmission on the channel.

In an embodiment, the method 100 comprises using the offset $SINR_{offset,i}$ for determining the link adaptation parameter $SINR_{LA,i}$ in link adaptation of a following transmission from the wireless device 3.

In an embodiment, the approximating 120 of the post-equalizer signal to interference plus noise ratio $SINR_{approx,i}$ comprises using an approximated post-equalizer signal power S, a noise and interference covariance matrix R, and a factor γ accounting for inter-stream interference.

In the above embodiment, the approximating 120 of the post-equalizer signal to interference plus noise ratio, $SINR_{approx,i}$, comprises using:

$$SINR_{approx,i} = \frac{S_{i,i}}{R_{i,i}} \cdot \gamma \quad (3)$$
$$S = PW^H H^H HW,$$

where S is an approximation of the post-equalizer signal power, and R is a noise and interference covariance matrix for the channel, W is a precoding vector for the transmission and P is the transmit power of the transmission. That is, the approximating 120 of the post-equalizer signal to interference plus noise ratio, $SINR_{approx,i}$, comprises dividing $S_{i,i}$ with $R_{i,i}$ and multiplying the result with the factor γ.

In another variation, the factor γ accounting for inter-stream interference is calculated according to:

$$\gamma = \begin{matrix} 1 & \text{rank} = 1 \\ |G|/(g_{11} \cdot g_{22}) & \text{rank} > 1, \end{matrix} \quad (4)$$

wherein $$G = \begin{bmatrix} g_{11} & g_{12} \\ g_{21} & g_{22} \end{bmatrix}$$

is equal to $H^H H$.

That is, for rank equal to one, the factor γ is set equal to one, and for rank higher than 1, γ is determined by normalizing the determinant of the channel covariance matrix, since this is a measure of the number of spatial streams that the channel can support.

In an embodiment, the determining 130 of the offset $SINR_{offset,i}$ comprises applying a filtering to the determined offset $SINR_{offset,i}$. That is, some kind of filtering or prediction is used. Such filtering could be realized in different ways, for example like a moving average or as a 1-tap immediate impulse response (IIR) filter according to:

$$SINR_{offsetFilt,i} = (1-\alpha) \cdot SINR_{offsetFilt,i} + \alpha \cdot SINR_{offset,i} \quad (6),$$

wherein α is a filter coefficient.

In a variation of the above embodiment, the method 100 comprises storing the filtered offset $SINR_{offsetFilt}$ in the network node 2 and using the stored filtered offset $SINR_{offsetFilt}$ the next time the wireless device 3 is being scheduled.

In an embodiment, the determining 110 of a channel covariance matrix $H^H H$ comprises receiving sounding reference signals or Demodulation Reference Symbols from the wireless device 3 and determining the channel covariance matrix $H^H H$ based thereon In an embodiment, the approximating 120 of the post-equalizer signal to interference plus noise ratio $SINR_{approx}$ comprises also using the interference plus noise covariance matrix R.

In an embodiment, the link adaptation parameter $SINR_{LA,i}$ is used for determining one or more of: transmission rank, modulation and coding scheme, precoding matrix and allocation size. The link adaptation parameter $SINR_{LA,i}$ may thus be used to adapt e.g. the transmission rank used to the radio link conditions.

In an embodiment, the received signal to interference plus noise ratio $SINR_{received}$ is available in the network node 2 or is calculated using the channel matrix H and the interference plus noise covariance matrix R. That is, a received signal to interference plus noise ratio $SINR_{received}$ previously determined and stored in the network node 2 may be used, or it may be calculated upon reception of a transmission from the wireless device 3.

Figure 5:
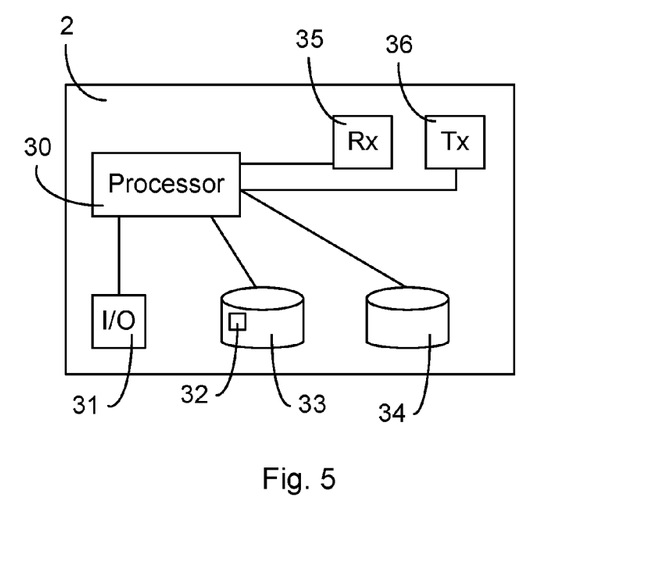
FIG. 5 illustrates schematically a network node and means for implementing methods of the present teachings.

FIG. 5 illustrates schematically a network node and means for implementing methods of the present teachings, in particular for implementing the various embodiments of the method 100 as described with reference to FIG. 4. The network node 2 comprises a processor 30 comprising any combination of one or more of a central processing unit (CPU), multiprocessor, microcontroller, digital signal processor (DSP), application specific integrated circuit etc. capable of executing software instructions stored in a memory 33, which can thus be a computer program product 33. The processor 30 can be configured to execute any of the various embodiments of the method as described e.g. in relation to FIG. 4.

In particular, a network node 2 of a communication system 1 is provided configured for determining a link adaptation parameter $SINR_{LA,i}$ for a wireless device 3. The network node 2 is configured to support a multi-antenna transmission mode comprising spatial multiplexing layers for transmission of data on a channel between the wireless device 3 and the network node 2. The network node 2 comprises a processor 30 and memory 33, the memory 33 containing instructions executable by the processor 30, whereby the network node 2 is operative to:

determine a channel covariance matrix $H^H H$ for the channel, wherein H is the channel matrix for the channel, approximate a post-equalizer signal to interference plus noise ratio $SINR_{approx.,i}$ for a spatial multiplexing layer i using the channel covariance matrix $H^H H$, determine an offset $SINR_{offset,i}$ to be the difference between a received signal to interference plus noise ratio $SINR_{received}$ and the approximated post-equalizer signal to interference plus noise ratio $SINR_{approx.,i}$ and determine the link adaptation parameter $SINR_{LA,i}$ to be the approximated post-equalizer signal to interference plus noise ratio, $SINR_{approx.,i}$, compensated by the determined offset $SINR_{offset}$.

In an embodiment, the network node 2 is configured to store and update the offset $SINR_{offset, i}$ in the network node 2, upon reception, from the wireless device 3, of a transmission on the channel. The network node 2 may for example store the offset $SINR_{offset, i}$ in any memory available to the processor 30, e.g. the memory 33.

In an embodiment, the network node 2 is configured to use the offset $SINR_{offset,i}$ for determining the link adaptation parameter $SINR_{LA,i}$ in link adaptation of a following transmission from the wireless device 3.

In an embodiment, the network node 2 is configured to approximate of the post-equalizer signal to interference plus noise ratio $SINR_{approx, i}$ by using an approximated post-equalizer signal power S, a noise and interference covariance matrix R, and a factor γ accounting for inter-stream interference.

In a variation of the above embodiment, the network node 2 is configured to approximate the post-equalizer signal to interference plus noise ratio $SINR_{approx, i}$ by using:

$$SINR_{approx,i} = \frac{S_{i,i}}{R_{i,i}} \cdot \gamma \quad (3)$$

$$S = PW^H H^H HW,$$

where S is an approximation of the post-equalizer signal power, and R is a noise and interference covariance matrix for the channel, W is a precoding vector for the transmission, and P is the transmit power of the transmission.

In another variation, the network node 2 is configured to calculate the factor γ accounting for inter-stream interference according to:

$$\gamma = \begin{matrix} 1 & \text{rank} = 1 \\ |G|/(g_{11} \cdot g_{22}) & \text{rank} > 1, \end{matrix} \quad (4)$$

wherein $$G = \begin{bmatrix} g_{11} & g_{12} \\ g_{21} & g_{22} \end{bmatrix}$$

is equal to $H^H H$.

In an embodiment, the network node 2 is configured to determine the offset $SINR_{offset, i}$ by applying a filtering to the determined offset $SINR_{offset, i}$ according to:

$$SINR_{offsetFilt,i} = (1-\alpha) \cdot SINR_{offsetFilt,i} + \alpha \cdot SINR_{offset,i} \quad (6),$$

wherein α is a filter coefficient.

In an embodiment, the network node 2 is configured to store the filtered offset, $SINR_{offsetFilt}$, in the network node 2 and use the stored filtered offset, $SINR_{offsetFilt}$, the next time the wireless device 3 is being scheduled.

In an embodiment, the network node 2 is configured to determine a channel covariance matrix $H^H H$ by receiving sounding reference signals or Demodulation Reference Symbols from the wireless device 3 and determine the channel covariance matrix $H^H H$ based thereon.

In an embodiment, network node 2 is configured to use the interference plus noise covariance matrix R in the approximating 120 of the post-equalizer signal to interference plus noise ratio $SINR_{approx}$.

In an embodiment, the network node 2 is configured to use the link adaptation parameter for determining one or more of: transmission rank, modulation and coding scheme, precoding matrix and allocation size.

Still with reference to FIG. 5, the memory 33 can be any combination of read and write memory (RAM) and read only memory (ROM). The memory 33 also comprises persistent storage, which, for example, can be any single one or combination of magnetic memory, optical memory, solid state memory or even remotely mounted memory.

A data memory 34 may also be provided for reading and/or storing data during execution of software instructions in the processor 30. The data memory 34 can be any combination of read and write memory (RAM) and read only memory (ROM).

The network node 2 further comprises an input/output (I/O) device 31, embodied as one or more separate units or as a single unit. By means of such I/O device(s) 31, the network node 2 may receive data from the wireless device 3 using receiver circuitry 35 (via antennas, not illustrated) and from other network nodes (e.g. via interconnecting cables, not illustrated). The network node 2 may also transmit data to the wireless device 3 (via antennas, not illustrated) and to other network nodes 3 (e.g. via interconnecting cables, not illustrated) by means of such I/O device(s) 31 using transmitting circuitry 36. The I/O device(s) 31 is/are operatively connected to the processor 30, which is thus able to transmit instructions and/or configuration parameters to the wireless device 3 (via antennas, not illustrated), e.g. based on information received from the wireless device 3. Examples of such configuration parameters comprise transmission rank, modulation and coding scheme, precoding matrix and allocation size. Other components of the network node 2 are omitted in order not to obscure the concepts presented herein.

The teachings of the present application also encompasses a computer program product 33 comprising a computer program 32 for implementing embodiments of the method as described earlier, and a computer readable means on which the computer program 32 is stored. The computer program product 33 may be any combination of read and write memory (RAM) or read only memory (ROM). The computer program product 33 may also comprise persistent storage, which for example can be any single one or combination of magnetic memory, optical memory or solid state memory.

The present teachings also comprise a computer program 32 for network node 2 for determining a link adaptation parameter, $SINR_{LA,i}$ for a wireless device 3. The network node 2 is configured to support a multi-antenna transmission mode comprising spatial multiplexing layers for transmission of data on a channel between the wireless device 3 and the network node 2. The computer program 32 comprises computer program code, which, when run on the network node 2 causes the network node 2 to:

determine a channel covariance matrix $H^H H$ for the channel, wherein H is the channel matrix for the channel, approximate a post-equalizer signal to interference plus noise ratio $SINR_{approx., i}$ for a spatial multiplexing layer i using the channel covariance matrix $H^H H$, determine an offset $SINR_{offset, i}$ to be the difference between a received signal to interference plus noise ratio $SINR_{received}$ and the approximated post-equalizer signal to interference plus noise ratio $SINR_{approx.,i}$ and determine the link adaptation parameter $SINR_{LA,i}$ to be the approximated post-equalizer signal to interference plus noise ratio SINR$_{approx.,i}$, compensated by the determined offset SINR$_{offset}$.

The computer program product 33, or the memory 33, thus comprises instructions executable by the processor 30. Such instructions may be comprised in a computer program, or in one or more software modules or function modules.

Figure 6:
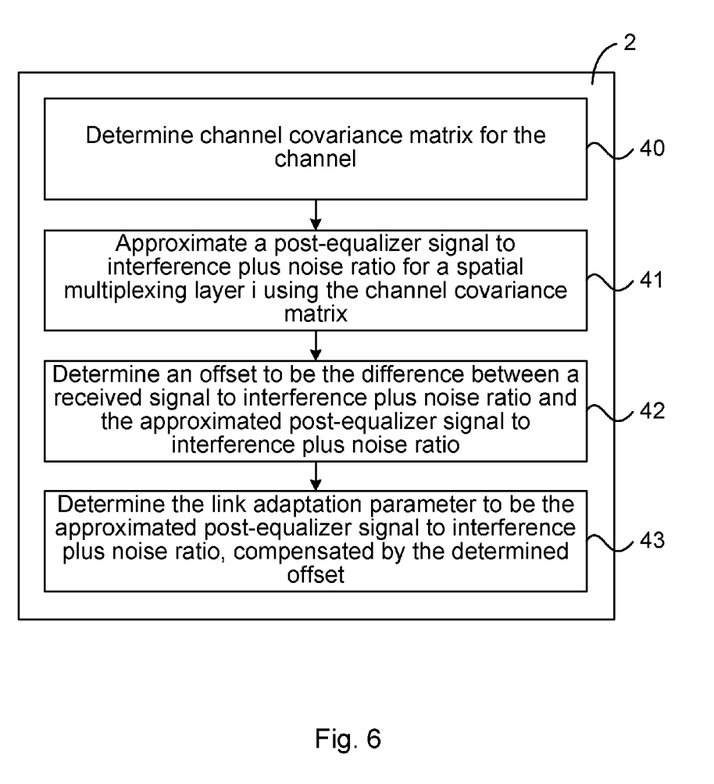
FIG. 6 illustrates a network node comprising function modules for implementing methods of the present teachings.

An example of an implementation using function modules/software modules is illustrated in FIG. 6, in particular illustrating network node 2 comprising function modules for implementing methods of the present teachings. The network node 2 comprises means, in particular a first function module 40, for determining a channel covariance matrix, H$^H$H, for the channel, wherein H is the channel matrix for the channel. The network node 2 comprises means, in particular a second function module 41, for approximating a post-equalizer signal to interference plus noise ratio SINR$_{approx., i}$ for a spatial multiplexing layer i using the channel covariance matrix, H$^H$H. The network node 2 comprises means, in particular a third function module 42, for determining an offset SINR$_{offset, i}$ to be the difference between a received signal to interference plus noise ratio SINR$_{received}$ and the approximated post-equalizer signal to interference plus noise ratio SINR$_{approx.,i}$. The network node 2 comprises means, in particular a fourth function module 43, for determining the link adaptation parameter SINR$_{LA,i}$ to be the approximated post-equalizer signal to interference plus noise ratio SINR$_{approx.,i}$ compensated by the determined offset SINR$_{offset}$.

The first, second, third and fourth functional modules 40, 41, 42, 43 can be implemented using software instructions such as computer program executing in a processor and/or using hardware, such as application specific integrated circuits, field programmable gate arrays, discrete logical components etc.

Figure 7:
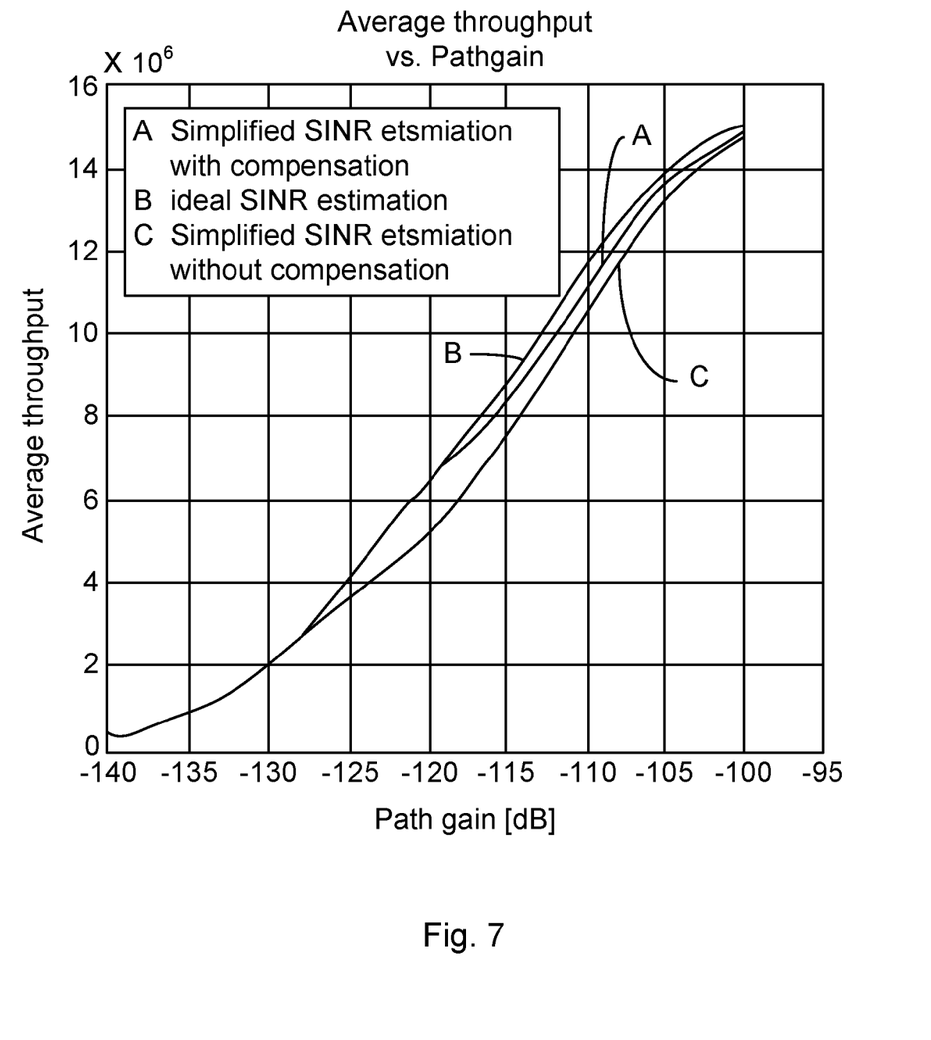
FIG. 7 illustrates in a graphic representation a performance comparison.

FIG. 7 illustrates in a graphic representation a performance comparison. The FIG. 7 illustrates the average throughput as a function of path gain, i.e. the average throughput is illustrated along the y-axis and the path gain along the x-axis. In particular, FIG. 7 provides a performance comparison between the present teachings (the graph indicated at A) and when using ideal SINR estimation (the graph indicated at B). The graph indicated at C is obtained when using only the expression (3), i.e. not using the feedback compensation. Comparing graph C with graph A illustrates the additional improvement of using the presented feedback compensation.

The present teachings have mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in a network node for determining one or more sets of transmission parameters to be used by a wireless device for transmitting data through a channel, the method comprising:

determining a first received post-equalizer signal to interference plus noise ratio, SINR$_{received}$, corresponding to first data transmitted by the wireless device, the first data transmitted through the channel and according to a first set of transmission parameters;

determining one or more approximate post-equalizer signal to interference plus noise ratios, SINR$_{appox,i}$, based on a channel covariance matrix, H$^H$H, representing the channel and on the first set of transmission parameters;

determining a first offset, SINR$_{offset,i}$, between SINR$_{received}$ and SINR$_{appox,i}$; and selecting, based on the first offset, a second set of transmission parameters corresponding to a second set of data to be transmitted by the wireless device through the channel, wherein the selecting is performed without determining an actual post-equalizer SINR in relation to the second set of transmission parameters and the channel.

2. The method as claimed in claim 1, wherein selecting the second set of transmission parameters comprises:

determining a plurality of further approximate post-equalizer signal to interference plus noise ratios, SINR$_{appox,i}$, based on the channel covariance matrix representing the channel and a corresponding plurality of transmission parameter set hypotheses;

selecting the second set of transmission parameters based on the maximum SINR$_{appox,i}$ of the determined plurality and on the first offset.

3. The method as claimed in claim 1, further comprising:

determining a second received post-equalizer signal to interference plus noise ratio, SINR$_{received}$, corresponding to second data transmitted by the wireless device, the second data transmitted through the channel and according to the second set of transmission parameters;

determining one or more further approximate post-equalizer signal to interference plus noise ratios, SINR$_{appox,i}$, based on a channel covariance matrix representing the channel and on the second set of transmission parameters;

determining a second offset between the second SINR$_{received}$ and the further SINR$_{appox,i}$; and determining a filtered offset based on the first offset and the second offset.

4. The method as claimed in claim 1, wherein determining one or more approximate post-equalizer signal to interference plus noise ratios, SINR$_{appox,i}$, comprises using an approximated post-equalizer signal power S, a noise and interference covariance matrix R, and a factor γ accounting for inter-stream interference.

5. The method as claimed in claim 4, wherein determining one or more approximate post-equalizer signal to interference plus noise ratios, SINR$_{appox,i}$, is based on the following relations:

$$SINR_{approx,i} = \frac{S_{i,i}}{R_{i,i}} \cdot \gamma$$

$$S = PW^H H^H HW$$

where S is an approximation of the post-equalizer signal power, and R is a noise and interference covariance matrix for the channel, W is a precoding vector for the transmission, and P is the transmit power of the transmission.

6. The method as claimed in claim 4, wherein the factor γ accounting for inter-stream interference is calculated according to:

$$\gamma = \begin{cases} 1 & \text{rank} = 1 \\ |G|/(g_{11} \cdot g_{22}) & \text{rank} > 1 \end{cases}$$

wherein $$G = \begin{bmatrix} g_{11} & g_{12} \\ g_{21} & g_{22} \end{bmatrix}$$

is equal to $H^H H$.

7. The method as claimed in claim 3, wherein the filtered offset is determined according to:

$$SINR_{offsetFilt,i} = (1-\alpha) \cdot SINR_{offsetFilt,i} + \alpha \cdot SINR_{offset,i}$$

wherein $\alpha$ is a filter coefficient, $SINR_{offsetFilt,i}$ is based on the first offset, and $SINR_{offset,i}$ corresponds to the second offset.

8. The method as claimed in claim 7, further comprising storing the filtered offset, $SINR_{offsetFILT}$, in the network node and using the stored filtered offset, $SINR_{offsetFILT}$, the next time the wireless device is being scheduled.

9. The method as claimed in claim 1, further comprising determining the channel covariance matrix, $H^H H$, based on receiving Sounding Reference Signals or Demodulation Reference Symbols from the wireless device.

10. The method as claimed in claim 1, wherein in determining the one or more approximate post-equalizer signal to interference plus noise ratios, $SINR_{appox,i}$, the interference plus noise covariance matrix, R, is used.

11. The method as claimed in claim 1, wherein the first and second sets of transmission parameters comprise one or more of: transmission rank, modulation and coding scheme, precoding matrix, allocation size.

12. The method as claimed in claim 1, wherein the first received signal to interference plus noise ratio, $SINR_{received}$, is determined using the channel matrix, H, and the interference plus noise covariance matrix, R.

13. A network node for determining one or more sets of transmission parameters to be used by a wireless device for transmitting data through a channel, the network node comprising a processor and memory, the memory containing instructions executable by the processor, that configure the network node to:
    determine a first received post-equalizer signal to interference plus noise ratio, $SINR_{received}$, corresponding to first data transmitted by the wireless device, the first data transmitted through the channel and according to a first set of transmission parameters;
    determine one or more approximate post-equalizer signal to interference plus noise ratios, $SINR_{appox,i}$, based on a channel covariance matrix, $H^H H$, representing the channel and on the first set of transmission parameters;
    determine a first offset, $SINR_{offset,i}$, between $SINR_{received}$ and $SINR_{appox,i}$; and
    select, based on the first offset, a second set of transmission parameters corresponding to a second set of data to be transmitted by the wireless device through the channel, wherein the selecting is performed without determining an actual post-equalizer SINR in relation to the second set of transmission parameters and the channel.

14. The network node as claimed in claim 13, wherein the network node is configured to select the second set of transmission parameters by:
    determining a plurality of further approximate post-equalizer signal to interference plus noise ratios, $SINR_{appox,i}$, based on the channel covariance matrix representing the channel and a corresponding plurality of transmission parameter set hypotheses;
    selecting the second set of transmission parameters based on the maximum $SINR_{appox,i}$ of the determined plurality and on the first offset.

15. The network node as claimed in claim 13, wherein the network node is further configured to
    determine a second received post-equalizer signal to interference plus noise ratio, $SINR_{received}$, corresponding to second data transmitted by the wireless device, the second data transmitted through the channel and according to the second set of transmission parameters;
    determine one or more further approximate post-equalizer signal to interference plus noise ratios, $SINR_{appox,i}$, based on a channel covariance matrix representing the channel and on the second set of transmission parameters;
    determine a second offset between the second $SINR_{received}$ and the further $SINR_{appox,i}$; and
    determine a filtered offset based on the first offset and the second offset.

16. The network node as claimed in claim 13, wherein the network node is configured to determine the one or more approximate post-equalizer signal to interference plus noise ratios, $SINR_{appox,i}$, by using an approximated post-equalizer signal power S, a noise and interference covariance matrix R, and a factor $\gamma$ accounting for inter-stream interference.

17. The network node as claimed in claim 16, wherein the network node is configured to determine the one or more approximate the post-equalizer signal to interference plus noise ratios, $SINR_{appox,i}$, based on the following relations:

$$SINR_{approx,i} = \frac{S_{i,i}}{R_{i,i}} \cdot \gamma$$

$$S = PW^H H^H HW$$

where S is an approximation of the post-equalizer signal power, and R is a noise and interference covariance matrix for the channel, W is a precoding vector for the transmission, and P is the transmit power of the transmission.

18. The network node as claimed in claim 16, wherein network node is configured to calculate the factor $\gamma$ accounting for inter-stream interference according to:

$$\gamma = \begin{cases} 1 & \text{rank} = 1 \\ |G|/(g_{11} \cdot g_{22}) & \text{rank} > 1 \end{cases}$$

wherein $$G = \begin{bmatrix} g_{11} & g_{12} \\ g_{21} & g_{22} \end{bmatrix}$$

is equal to $H^H H$.

19. The network node as claimed in claim 15, wherein the network node is configured to determine the filtered offset according to:

$$SINR_{offsetFilt,i} = (1-\alpha) \cdot SINR_{offsetFilt,i} + \alpha \cdot SINR_{offset,i}$$

wherein $\alpha$ is a filter coefficient, $SINR_{offsetFilt,i}$ is based on the first offset, and $SINR_{offset,i}$ corresponds to the second offset.

20. The network node as claimed in claim 19, wherein the network node is further configured to store the filtered offset, $SINR_{offsetFILT}$, in the network node and use the stored filtered offset, $SINR_{offsetFILT}$, the next time the wireless device is being scheduled.

21. The network node as claimed in claim 13, wherein the network node is further configured to determine the channel covariance matrix, $H^H H$, based on receiving Sounding Reference Signals or Demodulation Reference Symbols from the wireless device.

22. The network node as claimed in claim 13, wherein network node is configured to use the interference plus noise covariance matrix, R, in determining the one or more approximate-post-equalizer signal to interference plus noise ratio, $SINR_{appox}$.

23. The network node as claimed in claim 13, wherein the first and second sets of transmission parameters comprise one or more of: transmission rank, modulation and coding scheme, precoding matrix, allocation size.

24. A non-transitory computer-readable medium storing a computer program for configuring a network node to determine one or more sets of transmission parameters to be used by a wireless device for transmitting data through a channel, the computer program comprising computer program code that, when executed by processing circuitry of the network node, configures the network node to:

determine a first received post-equalizer signal to interference plus noise ratio, $SINR_{received}$, corresponding to first data transmitted by the wireless device, the first data transmitted through the channel and according to a first set of transmission parameters;

determine one or more approximate post-equalizer signal to interference plus noise ratio, $SINR_{appox,i}$, based on a channel covariance matrix, $H^H H$, representing the channel and on the first set of transmission parameters;

determine a first offset, $SINR_{offset,i}$, $SINR_{received}$ and $SINR_{appox,i}$; and select, based on the first offset, a second set of transmission parameters corresponding to a second set of data to be transmitted by the wireless device through the channel, wherein the selecting is performed without determining an actual post-equalizer SINR in relation to the second set of transmission parameters and the channel.

\* \* \* \* \*